June 12, 1956      V. S. REES      2,749,650
WEIGHT RELEASER FOR FISH LINES
Filed May 20, 1955
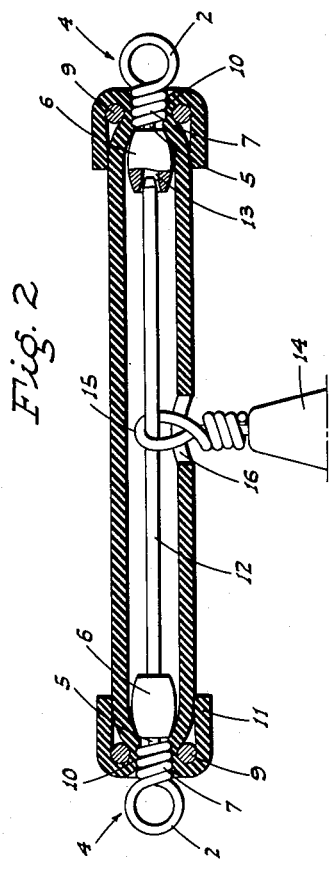
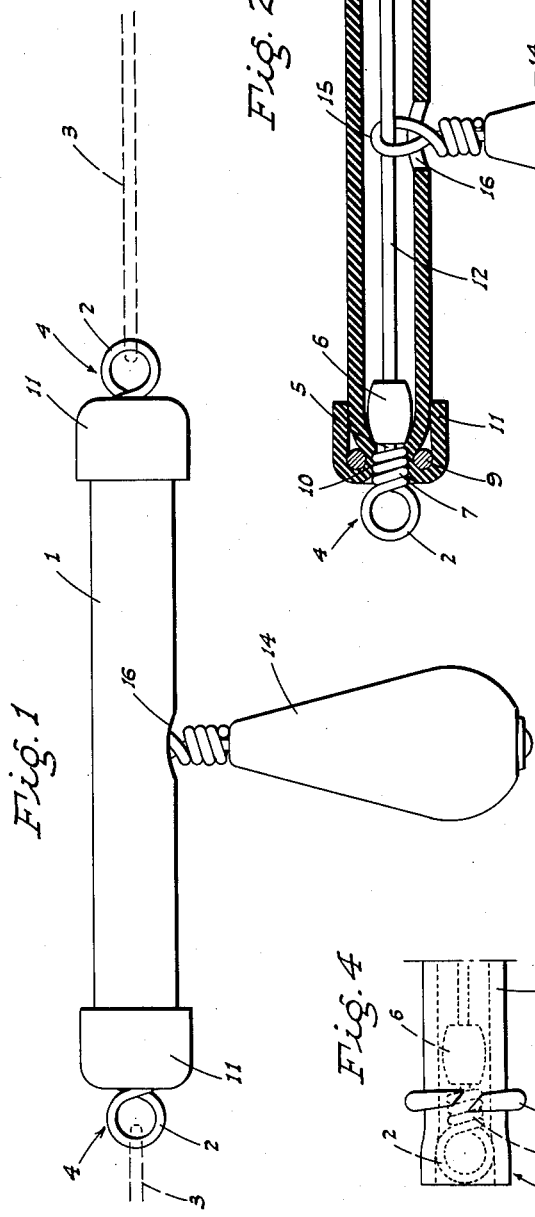
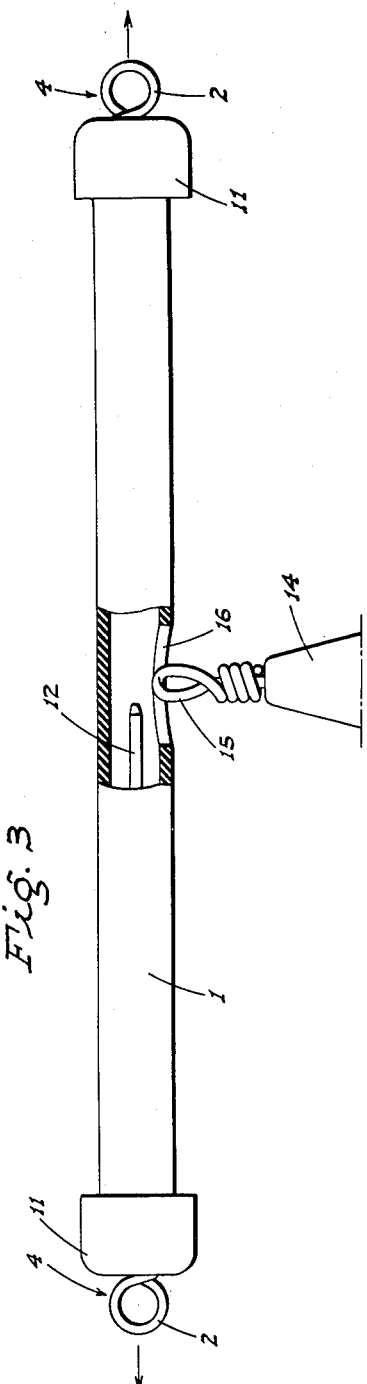
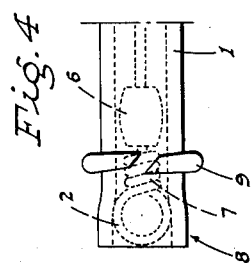
INVENTOR
Vivian S. Rees
BY
ATTORNEYS

United States Patent Office

2,749,650
Patented June 12, 1956

2,749,650

WEIGHT RELEASER FOR FISH LINES

Vivian S. Rees, North Sacramento, Calif.

Application May 20, 1955, Serial No. 509,818

2 Claims. (Cl. 43—43.12)

This invention relates to fishing equipment, and particularly to an attachment for fish lines such as are used by anglers for lake trout, steelhead, salmon, and similar game fish.

The major object of the invention is to provide a weight attaching device adapted to be interposed in the line or leader at a suitable point adjacent the lure or bait; the device normally but releasably securing the weight to such line or leader, and yet causing such weight to be released when the tension on the line exceeds a predetermined amount as when a fish strikes, is hooked, and is fighting against being reeled in. Such release of the weight then makes it easier for the angler to properly play and reel in the fish; the sport of playing the fish being much greater than when the weight remains attached.

Another object of the invention is to provide a device, for the purpose, which enables a weight to be easily attached to the device or removed therefrom by hand when desired, while at the same time positively preventing any possible release of the weight during normal manipulation of the line, such as when casting or trolling, or otherwise handling such line.

The device operates, to release the weight, solely by tension on the line, and a further object of the invention is to construct the device so that such tension must exceed a predetermined minimum in order that the weight will not be inadvertently released by an abortive nibble or strike on the part of a fish.

A further object of the invention is to provide a weight releaser for fish lines which is designed for ease and economy of manufacture, and convenience of use.

A still further object of the invention is to provide a practical, reliable, and durable weight releaser for fish lines, and one which is exceedingly effective for the purpose for which it is designed.

These objects are accomplished by means of such structure and relative arrangement of parts as will fully appear by a perusal of the following specification and claims.

In the drawings:

Fig. 1 is an enlarged side elevation of the releaser in its normal form and supporting a weight.

Fig. 2 is a similar sectional elevation of the releaser.

Fig. 3 is a side elevation of the releaser, partly broken out and in section, showing the device as extended by line tension and the weight in its position of initial release.

Fig. 4 is a fragmentary elevation illustrating the manner in which the line attaching units are secured to the body of the releaser.

Referring now more particularly to the characters of reference on the drawings, the releaser comprises an elongated tubular body 1 of flexible and resilient, or extensible and contractible, material such as a suitable grade of rubber. Eyes 2 are disposed at the opposite ends of the body in axial alinement therewith, for attachment, in the customary manner, to the fish line (or leader) in which the device is interposed, and which is indicated at 3.

The eyes 2 are each part of a metallic unit 4 which includes a central stem 5 projecting from the eye and to which a swivel bead 6 is connected; there being a rigid helical coil 7 about the stem between the bead 6 and eye 2 and rigid with the latter.

It is necessary that the eyes 2 shall not pull away from the body 1 even when considerable tension is placed on line 3, and the units 4, of which the eyes are a part, readily adapt themselves for fixed connection with said body in the following manner:

The normal bore of body 1 is slightly greater than that of beads 6 and coils 7, and initially each unit 4 is inserted into the body so that the latter overlies the eye 2, as shown at 8 in Fig. 4. A split metal ring 9 is then slipped onto the body 1 from the adjacent end thereof and disposed in a position over the coil 7. Thereafter, the ring 9 is closed onto the body, by means of a pliers or similar tool, until the adjacent portion of the rubber of the body is deformed and compressed against the coil 7 so that the rubber enters between the turns of the coil along its periphery, as shown at 10 in Fig. 2.

A firm hold between the coil and rubber is thus provided, making it practically impossible for the unit 4 to be pulled out from the body. The portion of the body 1 outwardly of ring 9 is then folded back onto said body in the form of a collar 11, exposing the eye 2 and covering ring 9 as shown in Figs. 1 and 2.

A central axial rod 12 extends in the body 1, from a permanent swivel connection in one bead 6, to the opposite bead and removably projects in a socket 13 in the adjacent end of said other bead when the body 1 is in its normal or non-extended condition.

A conventional weight 14 is provided on its upper end with an eye 15 through which the rod 12 projects in loose-fitting relation; the body at the bottom having an opening 16 through which the eye 15 freely projects so that the depending weight may have relatively free swinging movement on the rod 12 while preventing any material sliding movement, or change of position, of the weight on said rod and relative to the ends of the body 1.

In use of the described releaser, it will be evident that the weight will normally remain in connected association with the line. When, however, a heavy pull is placed on the line, as when a fish strikes, is hooked, and is fighting to escape, such pull is resisted from the other end of the line by the angler playing or reeling in the fish. When this occurs, the releaser body 1 elongates and the rod 12, being non-extensible and attached to one of the beads 6, pulls out of the other bead and moves away therefrom until the rod 12 is withdrawn from the eye 15. This allows the weight to drop clear of the releaser, as indicated in Fig. 3.

It will, of course, be understood that the size of the releaser, and its amount of elongation before the weight is released, is determined by the type and weight of fish for whose catching the particular fishing equipment—including the releaser—is to be used. The releaser will thus not fail to be sufficiently extended to release the weight when required, and yet the maximum elastic limit of the body will not be reached, and which would cause breaking of the rubber, or a failure of the same to return to its initial length, when the tension is withdrawn.

The free end of rod 12 being normally seated in the bead socket 13 requires, of course, a slight amount of elongation of the body in order to enable the rod to enter such socket. This positively prevents the weight 14 from pulling down the rod 12 so that its free end would bear against and possibly cut into or damage the rubber of the body.

It is to be recognized that the described weight releaser is of considerable advantage in the event that the sinker becomes snagged, as a mere pull on the line will release such sinker and permit the fisherman to retrieve the remainder of the tackle, such as leader, lure, hook, etc., and which are often costly items. The sinker, which is lost, is relatively cheap. Also, in the event of a snagged sinker, the fisherman, by releasing it, as above, does not lose time in tying on new leaders, lures, hooks, etc., and which would be required if the entire tackle assembly were lost.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A weight releaser, for a fish line, comprising an extensible, elastic, tubular body adapted to be interposed in and connected at its ends to a fish line in a manner to allow of extension of the body when the line is placed under tension, a relatively small-diameter rod within and extending lengthwise of the body, means connecting the rod at one end to the body adjacent one end thereof, the other end of the rod being free, and a weight having an eye at the upper end through which the rod slidably projects; the body having an opening in the bottom located intermediate the ends of the rod when the body is in its normal non-extended form and through which opening the eye freely projects for engagement with the rod.

2. In a releaser for a fish-line weight having an eye, and which releaser includes a tubular body of extensible and compressible rubber, the tubular body having an opening intermediate its ends through which the eye projects, and a rod extending lengthwise in the tubular body from adjacent one end and normally projecting through said eye; a coupling unit at each end of the tubular body comprising an eye disposed outside said body for line connection, a bead of smaller diameter than the normal bore of the body fitting within said body in longitudinally spaced relation connected to the eye, a helical coil of relatively small diameter compared to the bead and eye extending between the eye and said bead, and a rigid ring clamped about the tubular body in the zone of the coil and compressing the rubber in said zone into the interstices between adjacent turns of said coil; the rod at one end being connected to the bead of the corresponding coupling unit, and said rod withdrawing from the eye upon predetermined extension of the tubular body.

References Cited in the file of this patent

UNITED STATES PATENTS

| 1,296,057 | Ellsworth | Mar. 4, 1919 |
| 1,296,370 | Darling | Mar. 4, 1919 |
| 2,085,320 | Kolstrand | June 29, 1937 |
| 2,104,687 | Zahm | Jan. 4, 1938 |
| 2,117,322 | Hillman | May 17, 1938 |
| 2,488,475 | Merritt | Nov. 15, 1949 |
| 2,562,054 | Mathieu | July 24, 1951 |

FOREIGN PATENTS

| 124,487 | Switzerland | Feb. 1, 1928 |